(12) United States Patent
Furgalus (10) Patent No.: US 8,851,015 B2
(45) Date of Patent: Oct. 7, 2014

(54) JELLYFISH AQUARIUM

(71) Applicant: Todd Furgalus, Charlotte, NC (US)

(72) Inventor: Todd Furgalus, Charlotte, NC (US)

(*) Notice: Subject to any disclaimer, the term of this patent is extended or adjusted under 35 U.S.C. 154(b) by 0 days.

(21) Appl. No.: 14/152,475

(22) Filed: Jan. 10, 2014

(65) Prior Publication Data

US 2014/0123904 A1    May 8, 2014

Related U.S. Application Data

(63) Continuation-in-part of application No. 13/739,553, filed on Jan. 11, 2013, now Pat. No. 8,726,840.

(60) Provisional application No. 61/585,675, filed on Jan. 12, 2012.

(51) Int. Cl.
    *A01K 63/04*    (2006.01)
    *A01K 63/00*    (2006.01)

(52) U.S. Cl.
    CPC ............. *A01K 63/042* (2013.01); *A01K 63/003* (2013.01); *A01K 63/04* (2013.01); *A01K 63/045* (2013.01)
    USPC ....................................................... 119/245

(58) Field of Classification Search
    CPC ..... A01K 63/045; A01K 63/04; A01K 61/00; A01K 61/005
    USPC ......... 119/245, 200, 226, 251, 259, 260, 264, 119/268
    See application file for complete search history.

(56) References Cited

U.S. PATENT DOCUMENTS

| | | |
|---|---|---|
| 5,171,438 A | 12/1992 | Korcz |
| 5,245,945 A | 9/1993 | Liao |
| 6,276,302 B1 | 8/2001 | Lee |
| 7,029,577 B2 * | 4/2006 | Cummins ................ 210/167.31 |
| 7,578,262 B2 | 8/2009 | Vaccari |
| 7,604,734 B2 | 10/2009 | Smith |
| 7,610,878 B2 | 11/2009 | Stime, Jr. |
| 7,631,616 B2 | 12/2009 | Hsieh |
| 7,807,053 B2 | 10/2010 | Smith |
| 8,033,252 B2 | 10/2011 | Allis |
| 8,393,298 B2 | 3/2013 | Andon |
| 8,453,605 B2 | 6/2013 | Tominaga et al. |

* cited by examiner

*Primary Examiner* — Yvonne Abbott
(74) *Attorney, Agent, or Firm* — Hammer & Associates, P.C.

(57) ABSTRACT

An aquarium suitable for displaying jellyfish includes a chamber having interior walls that divide the chamber into a series of compartments. The first compartment is the viewing area having openings in the side walls that permit water to flow out of the viewing area while retaining jellyfish and flow into viewing area in a manner that keeps jellyfish suspended. A spillover riser is located between the first and second compartment that defines a channel through which the first and second compartment communicate. The second compartment has an air inlet providing the motive force to circulate water throughout the aquarium and introduce air bubbles to operate a foam fractionating device the inside the aquarium. The third compartment provides an area for placement of filter media and other necessary devices to keep jellyfish alive. The channel below the viewing area provides communication between the second and third compartment.

20 Claims, 10 Drawing Sheets

JELLYFISH AQUARIUM

RELATED APPLICATIONS

This application is a Continuation in Part of currently pending U.S. application Ser. No. 13/739,553 which was filed on Jan. 11, 2013, which gets its priority date from provisional application U.S. 61/585,675 which was filed on Jan. 12, 2012.

FIELD OF THE INVENTION

Aquariums for jellyfish.

BACKGROUND OF THE INVENTION

The present invention relates to aquariums, typically of a size that would be used in a residence or business rather than a commercial aquarium, and that are intended to provide an appropriate environment, potentially including salt water, in which small jellyfish and similar organisms can survive for extended periods.

The growth in the number and sophistication of municipal and state aquariums is at least one factor in the increased interest in smaller saltwater aquariums; e.g. for personal or business use rather than as public facilities. In turn, jellyfish represent a species that has gained interest because of their motion, appearance, and somewhat exotic nature.

Jellyfish are, however, delicate creatures of which only a very small amount (typically about 5%) is solid organic matter. Jellyfish are technically a form of plankton, are invertebrates, and lack any brain or specialized systems of digestion or circulation. Jellyfish have a limited nervous system that reacts to selected external stimuli.

Jellyfish depend entirely on factors other than themselves for horizontal movement; e.g., in nature winds, tides, and currents. Most jellyfish are, however, capable of some form of vertical motion and can orient themselves based upon their perception of light.

In an aquarium environment jellyfish cannot generally be maintained in a rectangular tank because they are likely to become stuck in, or injure themselves at, corners or similar spaces. Accordingly, a jellyfish aquarium (sometimes referred to as a kreisel tank) whether large or small typically has curved or circular geometry, and is designed to replicate (or at least appropriately mimic) ocean currents or similar movement that keep jellyfish suspended in water while maintaining their equilibrium and natural shape.

In such an aquarium, the water must move sufficiently to keep the jellyfish suspended and gently moving, but less than would injure the jellyfish or force them against the walls too aggressively. Furthermore, any pumps or other mechanical means for moving the water must avoid injuring or capturing the jellyfish. Because of their extremely low mass and fragile structure, jellyfish are easily drawn towards such outlets where they can become injured or die. Additionally, many jellyfish cannot tolerate air bubbles and thus any water-air mixtures or mixing devices (e.g., airstones) should be segregated from the jellyfish.

From a filtration standpoint, a jellyfish aquarium must provide both the desired saltwater environment and means for removing waste materials produced by the jellyfish or that are byproducts of the other aquarium functions. In most aquariums, such materials will include ammonia and similar compounds produced from the ongoing biological processes. These compositions will at some point become disadvantageous or hazardous to the jellyfish. A typical jellyfish aquarium should also have a surface skimming capability and a filtration capability. Some (but not all) jellyfish need to be maintained at or near colder ocean temperatures. In such cases, water temperature should also be maintained at or near 55-65° F. in order to mimic the ocean environment. For such jellyfish, an aquarium typically includes a cooling system of some type (refrigeration unit; chiller).

Because jellyfish are so fragile, such cooling and filtration systems are typically maintained separately from the aquarium tank itself and some piping and appropriate systems must be included to remove water from the aquarium, clean and chill the water, and return it to the aquarium tank; e.g., U.S. Pat. No. 7,610,878.

SUMMARY OF THE INVENTION

An aquarium suitable for displaying jellyfish includes a chamber having interior walls that divide the chamber into a series of compartments. The first compartment is the viewing area having openings in the side walls that permit water to flow out of the viewing area while retaining jellyfish and flow into viewing area in a manner that keeps jellyfish suspended. A spillover riser is located between the first and second compartment that defines a channel through which the first and second compartment communicate. The second compartment has an air inlet providing the motive force to circulate water throughout the aquarium and introduce air bubbles to operate a foam fractionating device the inside the aquarium. The third compartment provides an area for placement of filter media and other necessary devices to keep jellyfish alive. The channel below the viewing area provides communication between the second and third compartment.

The foregoing and other objects and advantages of the invention and the manner in which the same are accomplished will become clearer based on the followed detailed description taken in conjunction with the accompanying drawings.

DESCRIPTION OF THE INVENTION

FIGS. 1-6 illustrate a first embodiment of the aquarium. In this aspect, the aquarium includes a plurality of exterior walls that define a tank 20. In operation, the tank 20 holds the water (usually salt water) that supports the jellyfish. The illustrated embodiment includes six exterior walls: a horizontally oriented top exterior wall 21, respective vertically oriented side exterior walls 22 and 23, a horizontally oriented bottom exterior wall 24, and transparent front and rear walls 25 and 26. Thus, in exemplary embodiments the overall shape of the tank 20 is a solid rectangle with front and rear walls having larger dimensions than the top, bottom and side walls 21, 22, 23, 24. In other embodiments, the top exterior wall 21 can be eliminated and replaced (if desired) with a smaller cross brace between the front and rear walls 25, 26.

Figure 1:
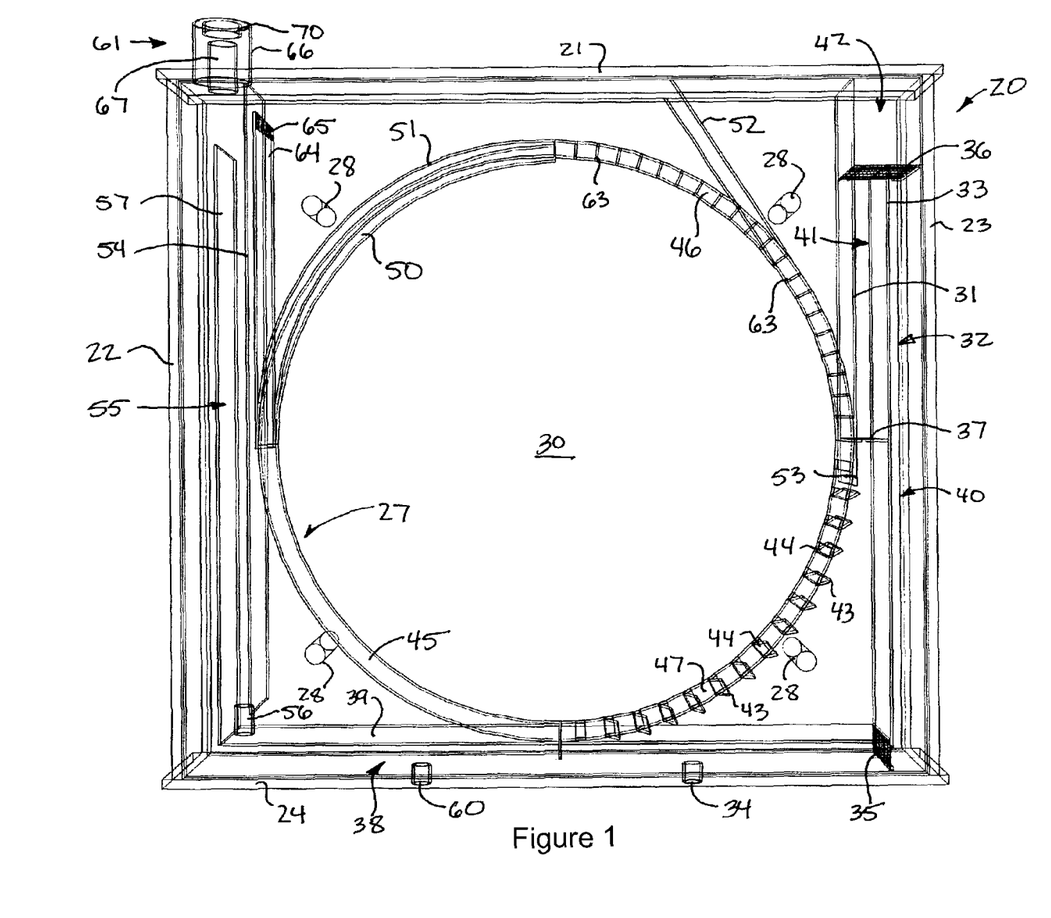
FIG. 1 is a front elevational view of an aquarium according to the present invention.
Figure 2:
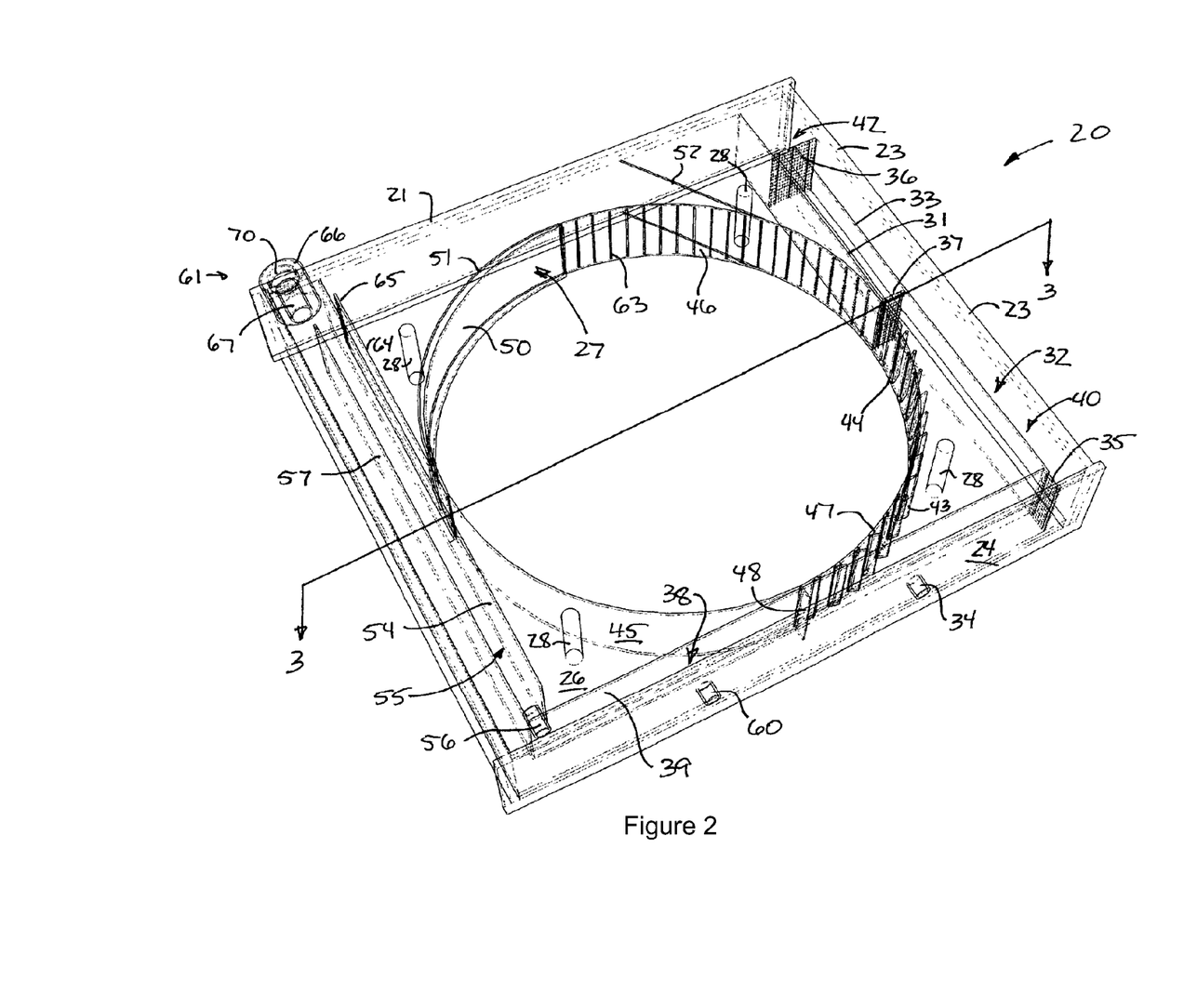
FIG. 2 is a perspective view of the aquarium of FIG. 1.
Figure 3:
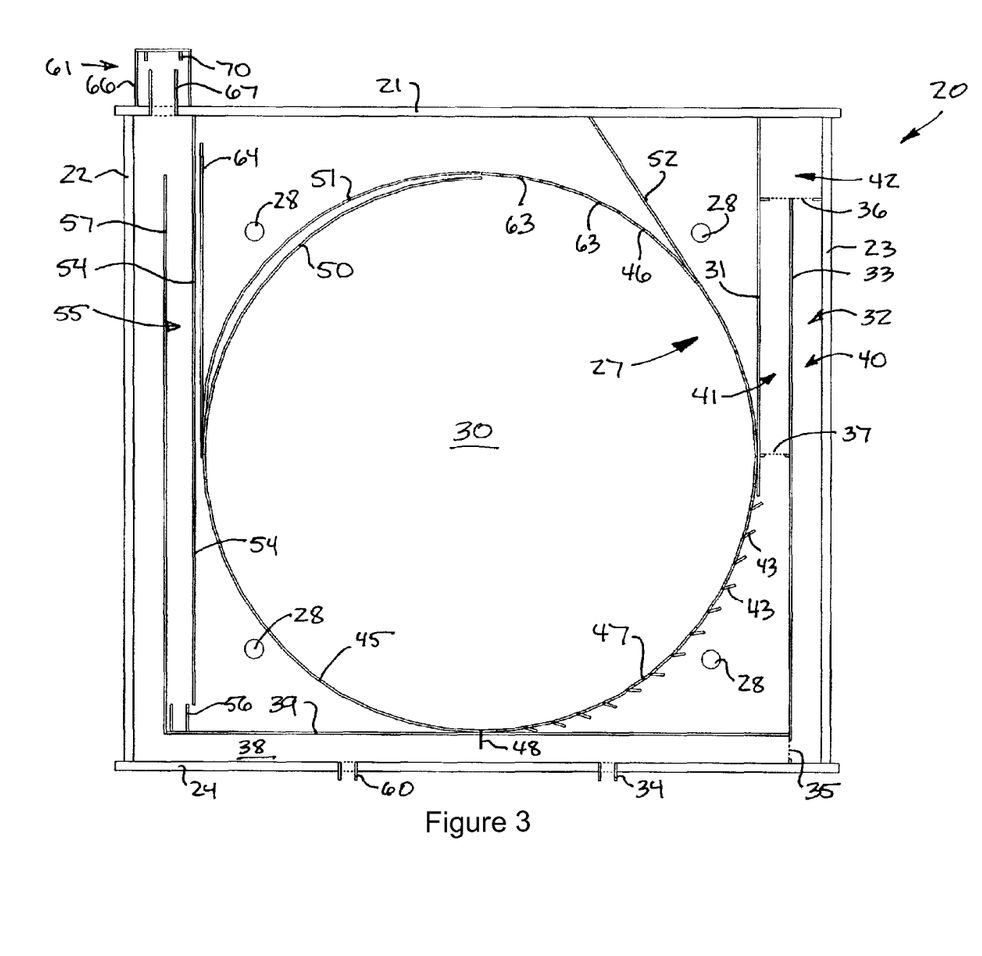
FIG. 3 is a cross sectional view taken along lines 3-3 of FIG. 2.
Figure 4:
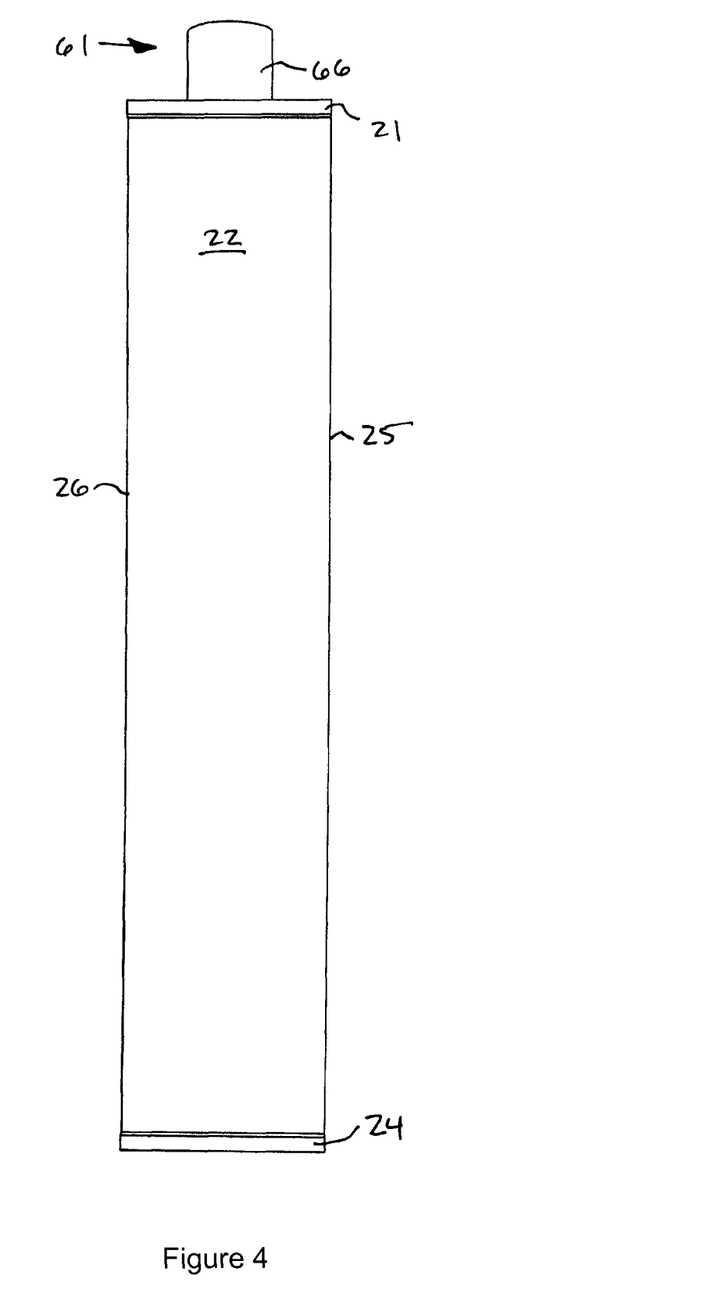
FIG. 4 is a side elevational view of the aquarium of FIG. 1.
Figure 5:
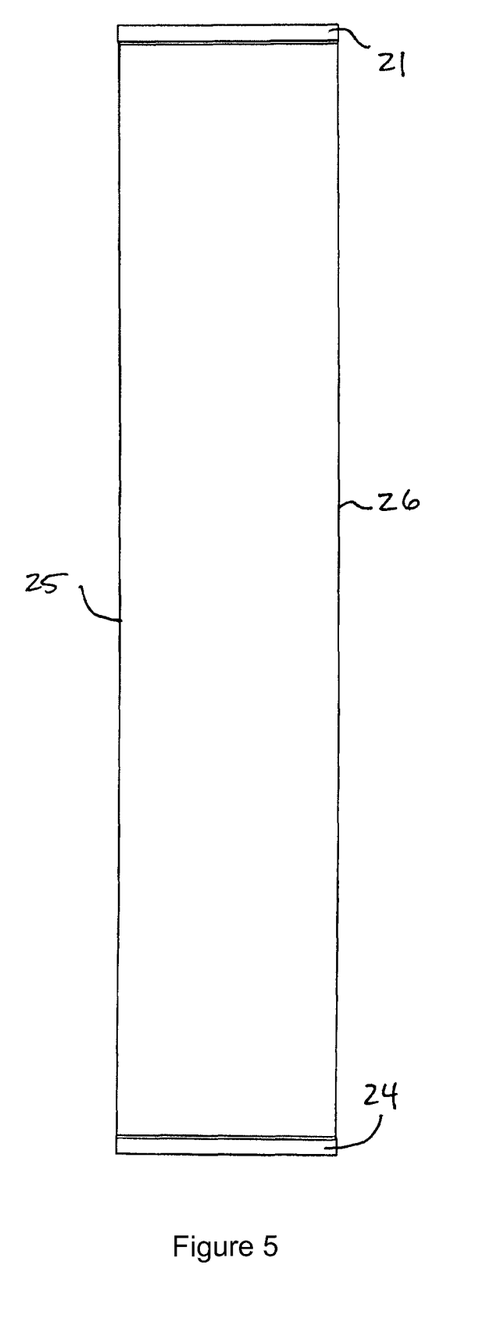
FIG. 5 is an opposite side elevational view from FIG. 4.
Figure 6:
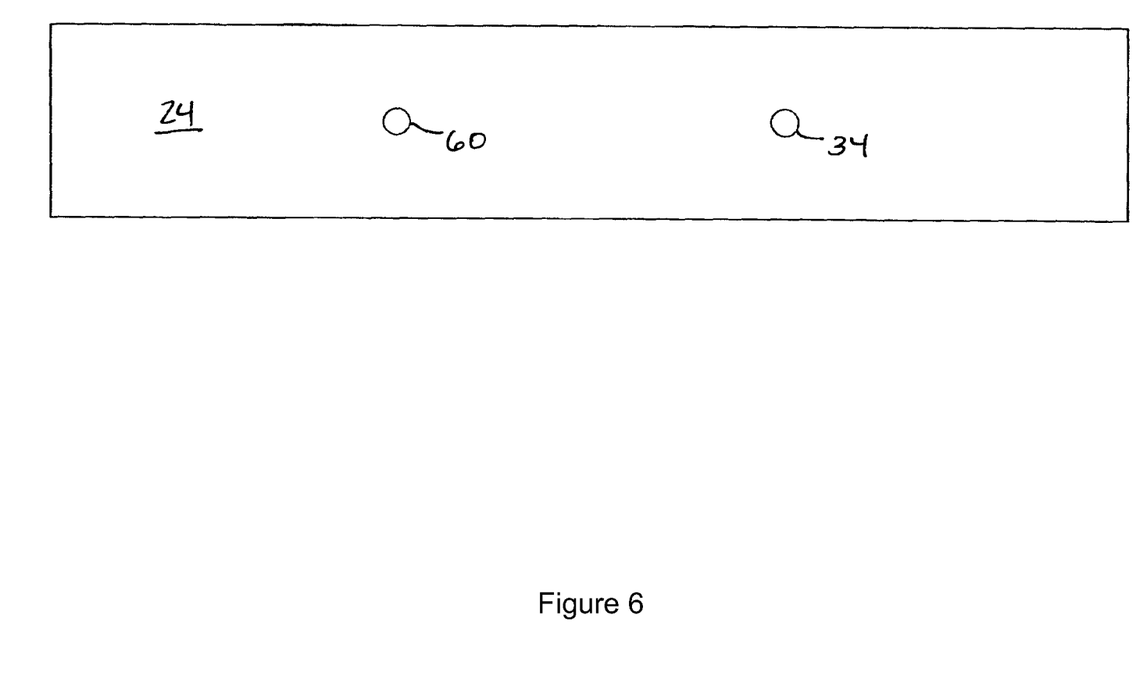
FIG. 6 is a bottom plan view of the aquarium of FIG. 1.

FIG. 1 illustrates the aquarium in a normal use orientation. At least the front and rear walls 25, 26 are formed of a polymer with at least the front wall being substantially transparent. In exemplary embodiments most or all of the parts illustrated and described herein are likewise formed of a polymer, and in some embodiments all of the structural parts are transparent. In general, any polymer that provides the structural strength necessary to hold the required amount of water, that is chemically inert with respect to both the seawater and the jellyfish (or other marine life), and that has the desired optical clarity will be suitable. Appropriate structural transparent polymers include, but are not limited to, acrylics, polycarbonates, and polyesters.

In the illustrated embodiment, several rods 28 provide additional support between the front and rear walls 25, 26. The illustrated embodiment includes four of the rods 28.

A cylindrical wall broadly designated at 27 is positioned within the tank 20 and spans the space between the front and rear walls 25, 26. In that manner, the cylindrical wall 27 defines a cylindrical viewing area 30. In an alternative embodiment, only the circular portion of the front wall 25 that is defined by the cylindrical wall 27 needs to be transparent in order to see the marine life (jellyfish) within the viewing area 30. In some embodiments both the front and rear walls 25, 26 are transparent for viewing from either side. In other embodiments, the rear wall 26 is covered with a mirrored surface (typically a thin polymer film) that enhances the perceived depth of the viewing area 30. If the rear wall 26 is transparent, the mirrored surface can be positioned on the outside of the rear wall 26, and facing inwardly. Such an arrangement provides the desired mirrored surface without placing the mirror material inside the tank or in contact with salt (or fresh) water. If desired, the rear wall 26 can, of course, be opaque.

A first upright interior wall 31 is located adjacent the cylindrical wall and defines a water inlet chamber broadly designated at 32. In the illustrated embodiment, the wall 31 and a media screen 37 form an L-shape adjacent a vertically oriented spillover riser 33 in the water inlet chamber 32. Water reaches the water inlet chamber 32 from the lower channel 38. If a chiller is used, water circulates from the aquarium 20 to the chiller through the water outlet 60 and then returns through the water inlet 34, both of which are positioned in the bottom exterior wall 24 and in communication with the water inlet chamber 32. The water inlet and outlets 34, 60 can also be used to circulate water outside of the aquarium for any other desired or necessary reason.

In the illustrated embodiment, the water inlet chamber 32 includes a plurality of media screens. A first media screen 35 is positioned at the bottom of the water inlet chamber 32, a second media screen 36 is positioned in upper portions of the water inlet chamber 32 and a third media screen 37 is positioned midway along the water inlet chamber 32 adjacent the cylindrical wall 27 and the upright wall 31. In exemplary embodiments, the screens are used to help position and maintain filtration media in various positions. In particular, a biological media can be positioned in the portions of the water inlet chamber designated at 40 and 41. A chemical media is positioned in the portion of the water inlet chamber 32 that is labeled as 42.

As with the other interior components, the screens can be formed of an appropriate polymer. If formed of another material (e.g., a metal) the screens used to be inert with respect to the other items (salt water, marine life, etc.) in the same manner as the other components. Depending upon the nature of the filter media, one or more of the screens may be unnecessary. For example, fibrous materials will tend to stay in place without a screen more easily than will particles.

Most of the waste generated by the jellyfish will be in the form of ammonia which is produced by the breakdown of proteins and which is toxic to most animals. Ammonia. Thus, as used herein, the term "biological medium" (or "biomedia") refers to any appropriate media upon which organisms will grow that help convert the ammonia into nitrites, nitrates, and then nitrogen gas. The overall process is generally referred to as "nitrification."

The relevant nitrification organisms will tend to cultivate on gravel, or rocks, or other inert surfaces in the aquarium. In the present invention, any media that promote the growth of the desired organisms while otherwise remaining inert to the aquarium water and harmless to the jellyfish are appropriate. Appropriate media can include (but are not limited to) rocks and gravel, small plastic or ceramic objects, or small pieces of minerals such as quartz.

As used herein "the term "chemical medium" tends to refer to filter media that do not necessarily encourage the growth of bacteria, but which have characteristics that otherwise help purify water that comes in contact with these materials. The most widely used chemical medium is activated carbon which, as known to the skilled person, helps purify the water by at least three processes: adsorption of particles onto the surface of the carbon based on static forces; diffusion of gases (which can help convert toxic ozone into oxygen) and chemisorption in which impurities chemically bind to the carbon. Generally, a given amount of activated carbon has finite adsorption capabilities and thus should be replenished on a periodic basis.

Alternative chemical media can include ion exchange resins which purify the water by adding or removing specific ions. Such media are also referred to as deionizing resins.

It will be nevertheless understood that in many cases, and even under the best conditions of physical, chemical, and biological filtration, fresh water (including sea water) will still be required on a time to time basis. The advantage of the invention, however, is in minimizing the need for such exchanges or other treatment.

Because water moves cyclically through all of the portions of the aquarium, the "starting point" is arbitrary. Thus in one sense (and for descriptive purposes rather than limitation), water enters the tank 20 at the water inlet 34 and flows through a lower channel 38 that is defined between the bottom exterior wall 24 and a horizontal interior wall 39. The water flows toward the media screen 35 and then into the water inlet chamber 32. The water then travels upwardly over the biological media 40 to the chemical media 42 and then downwardly through the second portion of biological media 41. The water then reaches the deflectors 43 in the cylindrical wall 27. The deflectors 43 are movably attached to the respective openings 44 that permit incoming water to reach the viewing area 30. The deflectors 43 help encourage water flowing through the openings 44 to move in a gentle laminar manner that enhances the growth and survival of the jellyfish.

In different embodiments, the cylindrical wall 27 can be either unitary or formed of several separate wall portions. The illustrated embodiment includes four portions respectively designated at 45, 46, 47 and 50. When constructed in this manner, the wall portions are both movable (to provide an opening into which marine life can be placed into the viewing area 30) and removable (typically for cleaning or replacement purposes). In that regard, the wall portions 45, 46, 47, 50 are positioned between respective circular grooves in the front and back walls 25, 26. These grooves are congruent with the cylindrical wall 27 and thus not separately illustrated in FIG. 1. Additional grooves, however, are positioned in the front and back walls 25, 26 to permit movement. An arc groove 51 is illustrated just above the wall portion 50 in upper left-hand portions of the viewing area 30. Linear grooves (i.e., one in front wall 25 and a parallel one in rear wall 26) 52 extend from a position adjacent the wall portion 46 to the top exterior wall 21.

In one embodiment of the present invention, a semi-cylindrical wall 27 may be comprised of separate, removable sections which are also interchangeable to alter the water flow characteristics/pattern within the viewing area 30 of the tank. In another embodiment, the cylindrical wall 27 can be either unitary or formed of several separate wall portions. The cylindrical wall 27 may include four separate portions respectively designated at 45, 46, 47 and 50 as described previously.

In the illustrated embodiment, a baffle 48 (optionally removable) is positioned adjacent the horizontal interior wall 39 and extends into the lower channel 38. When water enters through the water inlet 34, the baffle 48 helps prevent backflow towards the water outlet 60.

In use, in order to open or close the viewing area for access, the wall portion 46 can be moved in a counter clockwise direction into the arc groove 51. Additionally, when the wall portion 46 is in the groove 51, wall portion 47 can be raised and removed by sliding it counterclockwise to the linear grooves 52 and then out of the tank 20. Wall portions 45 and 50 can be removed in the same manner. It will be understood that once one or two of the wall portions are removed, the others can be moved either clockwise or counterclockwise until they reach, and can be removed through, the linear grooves 52.

In the drawings, the arc groove 51 and the wall portion 50 are shown as slightly separated. This is for illustration purposes. In actuality, the wall portion 50 is positioned directly over the arc groove 51.

The removal step is enhanced by some of the additional illustrated features. In particular, the first interior wall 31 has a downwardly depending leg portion 53. This downwardly depending portion 53 encourages the deflectors 43 to fold inwardly (i.e. towards the wall portion 47) as they pass and reach the depending portion 53 in order to facilitate their removal.

FIG. 1 also illustrates that in this embodiment the aquarium tank 20 includes a second upright interior wall 54 which is adjacent to the cylindrical wall 27 and opposite (and as illustrated parallel to) the first upright wall 31. The second upright wall 54 defines an air inlet chamber 55 between the cylindrical wall 27 and a different exterior wall, in particular the left side exterior wall 22 in the illustrated embodiment. A second spillover riser 57 is vertically oriented in the air inlet chamber 55.

An airstone holder 56 is positioned in lower portions of the air inlet chamber 55. The airstone holder provides a position for an airstone (or "bubbler," not shown) which can be supplied with air in any appropriate manner, with a flexible plastic tube (not shown) is typical. Aquarium airstones and their related parts (air pumps, tubes, etc.) are well understood in the art and will not be otherwise described in detail herein. As the figures illustrate, a small space between the return riser 64 and the airstone holder 56 permits water to flow into the air inlet chamber 55.

In operation, air (typically from a compressor or small pump, not shown) is sent to the air inlet chamber 55 from an airstone in the holder 56. As air rises in the air inlet chamber 55, it encourages water to flow in the same direction. When the water and air reach the top of the spillover riser 57, air can escape through the froth chamber broadly designated at 61. Meanwhile, the water reverses direction and travels downwardly along the side exterior wall 22 and from there to the water outlet 60 in the bottom exterior wall 24 of the tank 20. As the water travels downwardly, any remaining air bubbles tend to separate and rise upwardly. As a result, the possibility of air bubbles reaching the viewing area is minimized or eliminated.

The overall water flow in the illustrated embodiment thus proceeds as follows. Water enters through the inlet 34 in the bottom exterior wall 24 and then moves into the water inlet chamber 32 which contains the biological media 40. The water travels upwardly through the biological media 40 through the media screen 36 and then through the chemical media 42 in the top portion of the water inlet chamber 32. The water then travels downwardly through the second set of biological media 41 in the water inlet chamber 32 through the media screen 37 and then to those portions of the tank 20 that are adjacent the deflectors 43 and the openings 44. The water then flows into the viewing area 30 over the deflectors 43 and through the openings 44. The water exits the viewing area through the perforations or slots 63 in the upper right-hand wall portion 46. The water then moves along the top of the tank 20 but outside of the viewing area 30 towards a return riser (or overflow bulkhead) 64 which includes a comb 65 in its upper portions which helps enhance surface skimming of debris and some organic compositions from the moving water. The water then moves downwardly through the narrow space defined between the return riser 64 and the second upright interior wall 54 until the water reaches the bottom left-hand portion of the tank 20 adjacent the airstone holder 56. In some embodiments, the return riser 64 and the wall portion 45 can be formed of a single piece. Because of their respective positions, neither needs to be removed to provide access to the viewing area 30.

As set forth previously, air is pumped into the tank and provides the mechanical force to move the water in the indicated manner. The water moves upwardly through the air inlet chamber 55 to the top of the spillover riser 57. At this point, because the water has exited the viewing area, it is likely to carry various contaminants with it. Some of the contaminants will typically mix with the water and air (i.e., cling to the surface of air bubbles) to create a froth that rises into the froth chamber 61.

The froth chamber 61 is formed of a collection cup 66 (exterior) and an interior froth tube 67. When froth moves upwardly from the air inlet chamber 55 through the froth tube 67 it reaches a downwardly depending deflector 70 at the top of the froth chamber which encourages it to move into the collection cup 66 from which it can be manually removed. In the illustrated embodiment, the deflector 70 is in the form of a short, and thus relatively broad, tube.

Figure 7:
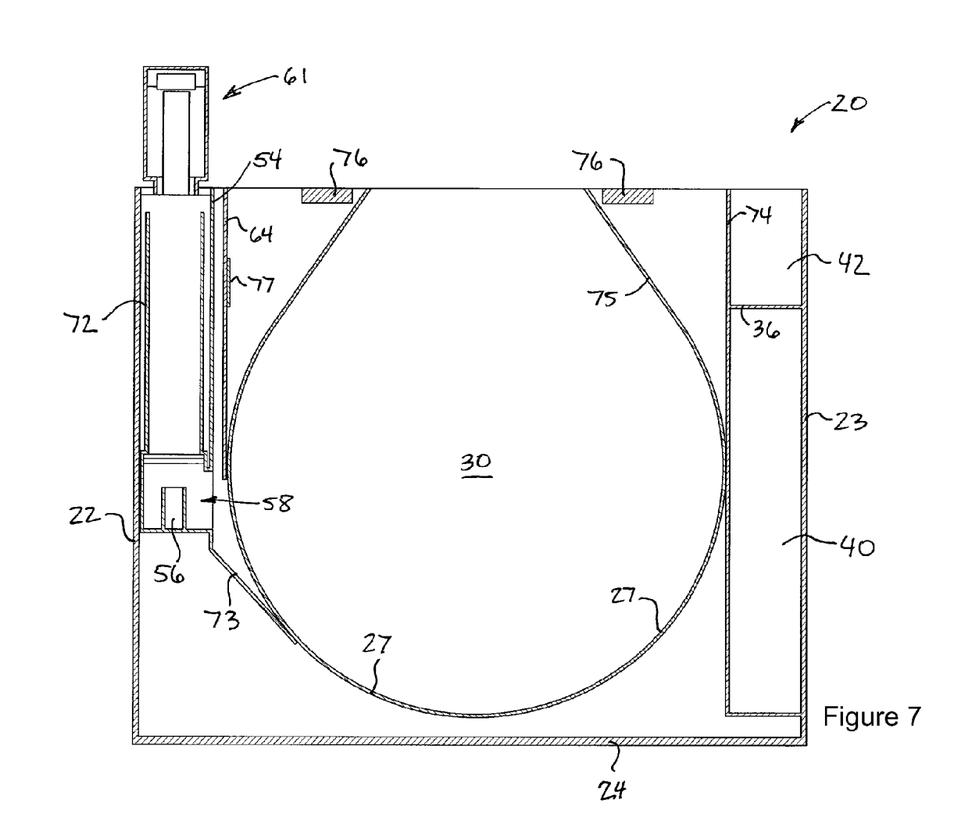
FIG. 7 is a cross-sectional view of a second embodiment of an aquarium according to the invention.

FIG. 7 is a cross-sectional view of a second embodiment of the invention. A number of the elements are either identical or nearly-identical to those of the first embodiment and accordingly carry common reference numerals. These include the tank broadly designated at 20, the cylindrical viewing area 30, the sidewalls 22 and 23, and the bottom wall 24. Other common elements include the cylindrical wall 27 that defines the viewing area 30, the biomedia area 40, the chemical media area 42, the air inlet holder 56, and the return riser 64. The froth chamber broadly designated at 61 is also essentially the same as the one already described.

Some of the different aspects will be clearly understood with respect to FIGS. 7-10, and particularly when described in the context of the direction of water flow in FIG. 7. First, when an air stone is placed in the holder 56, bubbles pumped though such an airstone rise through a tube 72 in the air inlet chamber broadly designated at 55. The top of the tube 72 now represents the outlet position for water leaving the air inlet chamber 55.

As in the previous embodiment, bubbles rising from an air stone encourage water to flow with the bubbles, and out of the air inlet chamber 55 to the space between the tube 72 and the interior wall 54, and then downwardly to the lower portions of the tank 20 outside of the viewing area 30. The tube 72 above the airstone in the holder 56 can help pull water somewhat more effectively than some other structures. Additionally, positioning the air inlet further above the bottom wall 24 and more towards the mid level of the tank 20 creates extra space in the lower corner which in turn helps encourage a more effective air separation.

As in the previous embodiment, the air inlet chamber 55 is defined by the sidewall 22 and a vertical interior wall 54. Water flows downwardly between the tube 72 and the wall 54 toward the diagonally disposed plate 73 and then past the outside of the cylindrical wall and then adjacent the bottom wall 24. The water then flows through a media screen (not shown) at or near the bottom of the biomedia space 40 into the biological medium in the space 40, and then into the chemical media 42. The chemical a biomedia spaces 40,42 are separated by the media screen 36. The water then moves from the chemical media area 42 through another media screen 74 into an upper portion of the tank 20 (i.e., illustrated as the upper right portion of FIG. 7).

In comparison to the water flow path of the first embodiment, the water enters the viewing area 30 through a plurality of openings (not visible in the perspective views) in an upper portion of the cylindrical wall 27 that faces the general corner defined by the vertical media screen 74 and the top of the tank 20.

From the viewing area 30, water flows through openings (e.g., 81 in FIG. 10) to the return riser 64. The water passes through openings 80 (e.g., FIG. 8) in the return riser 64 and then downwardly to the opening 58 in the air inlet chamber 55 adjacent the air stone holder 56.

A pair of braces 76 helps support the front and rear walls 25 and 26 (which are not visible in the cross-section of FIG. 1). FIG. 7 also shows a sliding door 77 that moves vertically to adjust the flow of water through the return riser 64, and thus helps control the overall flow rate in the tank 20, including the particular velocity of water movement in the viewing area 30.

Figure 8:
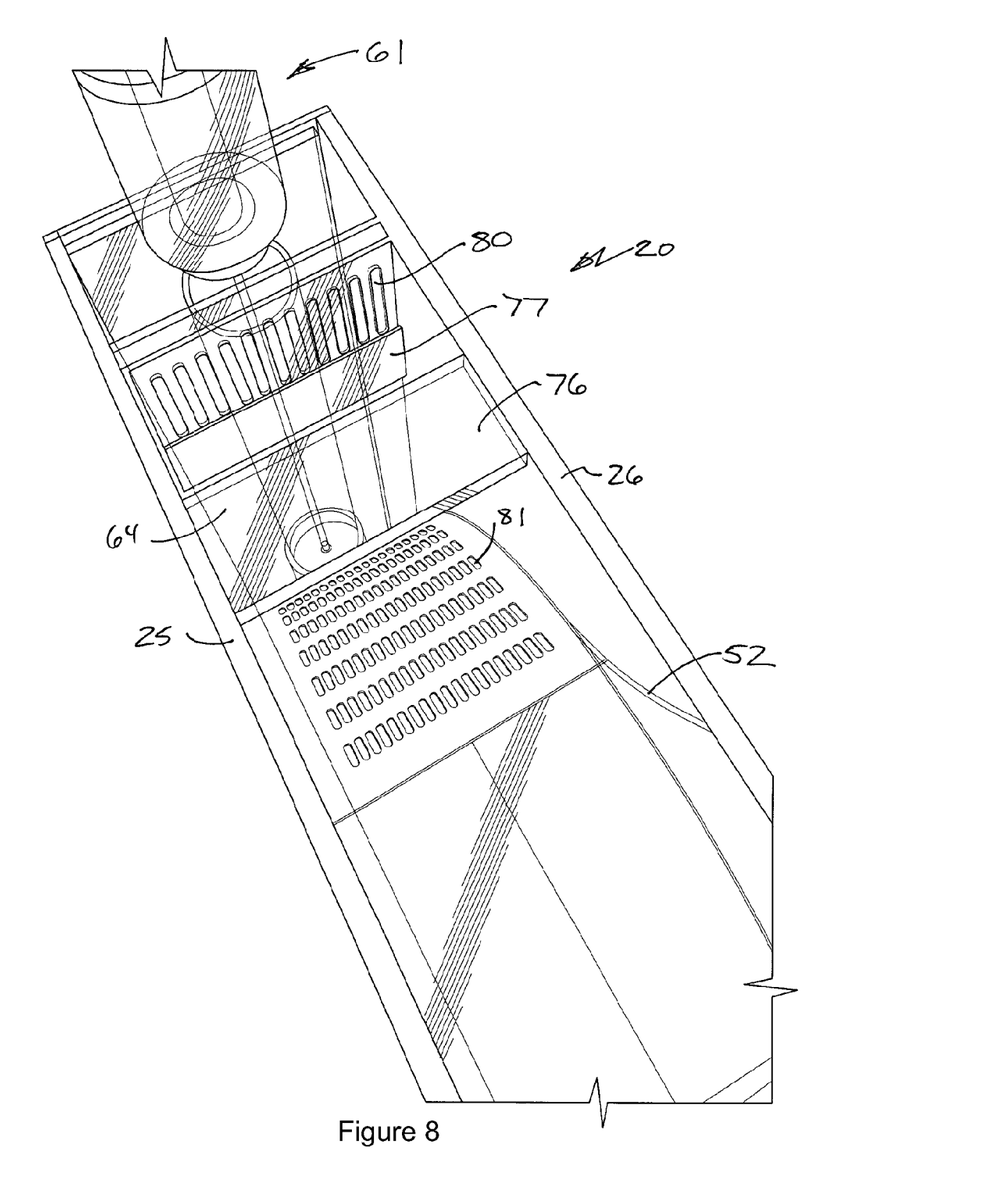
FIG. 8 is a perspective view of a portion of the embodiment of FIG. 7.

FIG. 8 is a perspective view of an upper corner of the second embodiment. FIG. 8 illustrates the front wall 25 (which is always transparent) and the rear wall 26 which can be transparent, mirrored, or opaque. FIG. 8 illustrates that the return riser 64 includes a plurality of slotted openings 80. Water that has left the circular viewing area 20 returns over the riser 64 through these slots 80. The sliding door 77 can be vertically adjusted to raise or lower the position at which water flows through the slots.

FIG. 8 also illustrates that water leaves the cylindrical viewing area 30 through the slots 81 in a portion of the cylindrical wall 27. The slots 81 need to be sized for appropriate water flow, but without creating suction or vortex flow that is strong enough to draw the jellyfish into the openings and hold there. FIG. 8 also illustrates a set of grooves (one is illustrated) 52 through which segments of the cylindrical wall can be removed in a manner previously described with respect to the first embodiment. The portion of the cylindrical wall 27 that holds the slots 81 typically extends to the top of the tank 20 (e.g., FIG. 10), but for clarity, FIG. 8 illustrates only a portion of this. The slots 81 may be located on any portion of the cylindrical wall 27.

Figure 9:
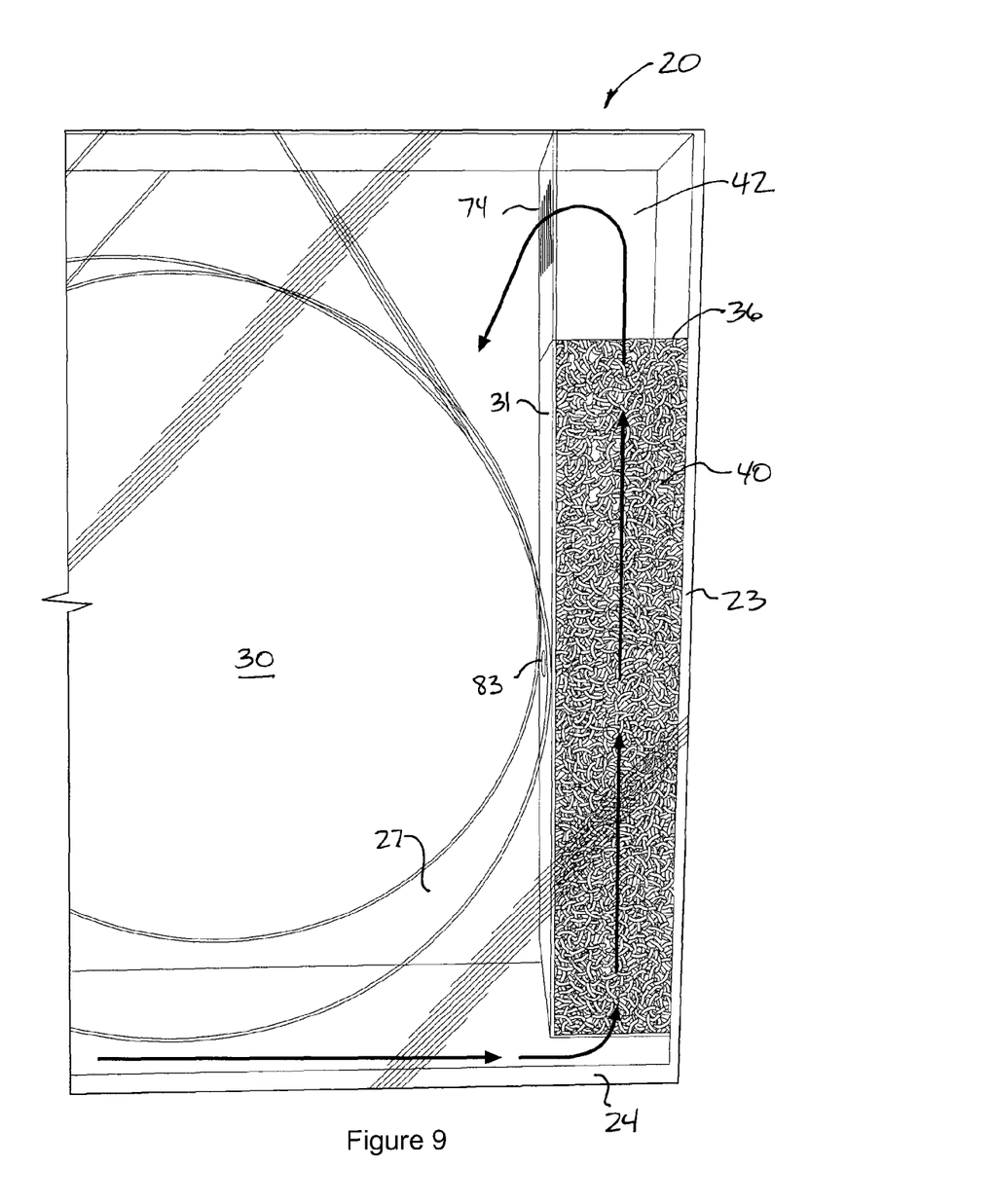
FIG. 9 is another partial perspective view of the second embodiment.

FIG. 9 is another partial perspective view of the (as illustrated) right-hand portion of the tank 20. In particular, FIG. 9 illustrates a filling of support material 82 of the type previously described that will encourage the growth of a biological media which in turn filters water passing through it. A corresponding chemical media can be positioned in the space 42 that is separated from 40 by a media screen 36. As FIG. 9 further illustrates, another media screen 74 with a plurality of slots holds the chemical media in place as water flows in the direction indicated by the arrows.

FIG. 9 also shows a small opening 83 that allows any accumulated microbubbles—that might otherwise form in the (as illustrated) lower right-hand corner of the tank 20—to move into the biofiltration area 40. In particular, the cylindrical wall 27, the bottom wall 24, and the interior wall 31 for the biomedia area 40 define a quasi-triangular shaped area into which microbubbles can gather into one or more larger bubbles which then move into the biological medium 82 from where they will tend to rise to the top of the tank 20 without negatively affecting the jellyfish in the viewing area 30. FIG. 9 also helps illustrate that in this embodiment water returns to the circular viewing area 30 through an upper portion of the circular wall 27 rather than a lower portion as in the first embodiment. The small opening 83 may also be located on any surface within the tank where bubbles or microbubbles may accumulate in order to aid in their dispersion.

Figure 10:
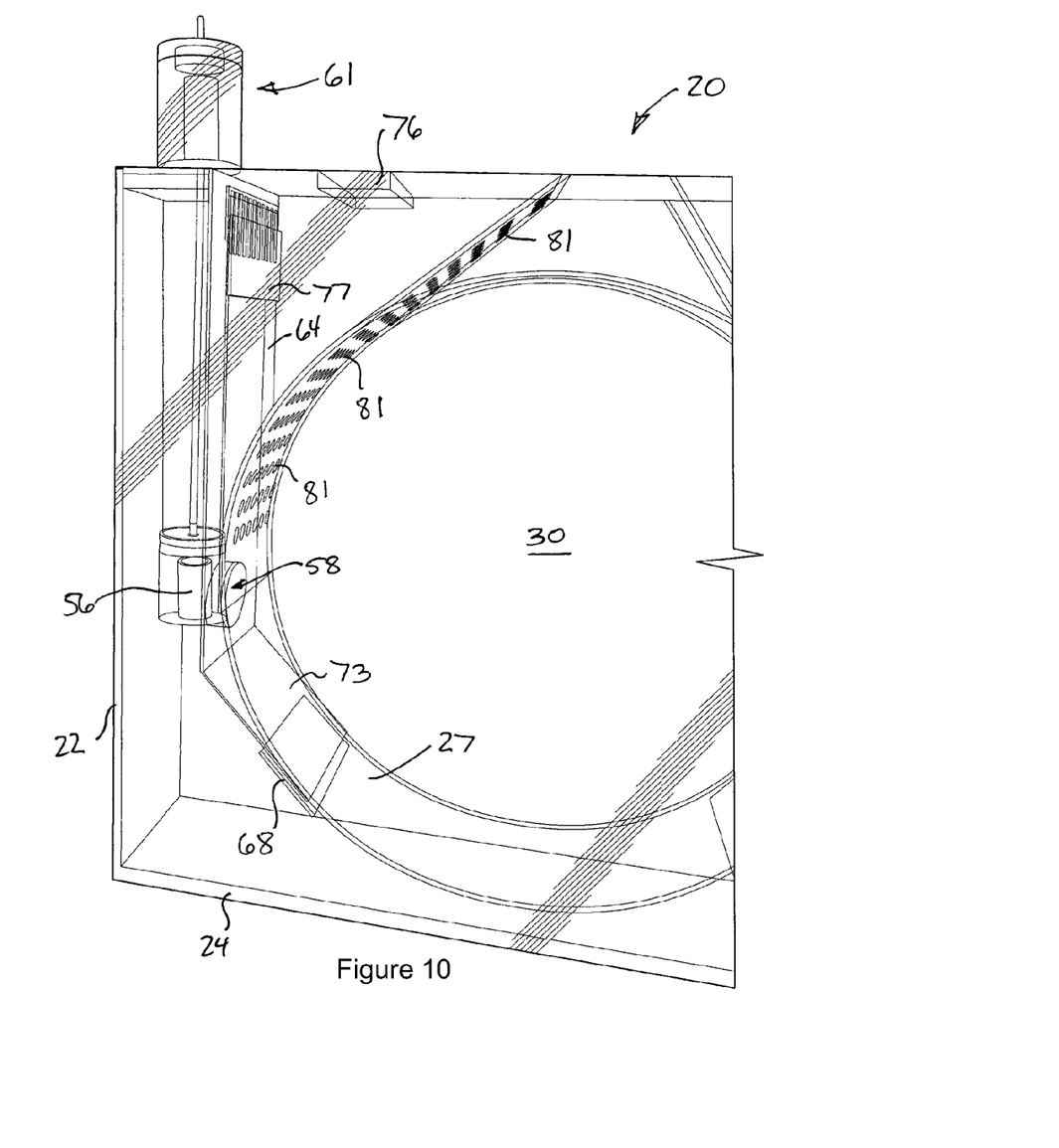
FIG. 10 is another partial perspective view of the second embodiment.

FIG. 10 shows some of the similar details as FIGS. 7 and 8 but in particular illustrates that the slots 81 through which water travels from the cylindrical viewing area 30 towards the return riser 64 extend along a significant portion of the cylindrical wall 27, and then extend further along a common piece all the way to the top of the aquarium tank 22; i.e., a position adjacent the top of the front and rear walls 25, 26. FIG. 10 also illustrates the presence of an optional brace 68 between the front and rear vertical walls, 25, 26. One or more of such braces can be added between the walls as may be desired or necessary.

In one embodiment of the present invention, the air inlet chamber 55, in conjunction with the collection cup 66 within the froth chamber 61, forms a foam fractioning device/protein skimmer. Foam fractionation is a chemical process in which hydrophobic molecules are preferentially separated from a liquid solution using rising columns of foam. It is commonly used, albeit on a small scale, for the removal of organic waste from aquariums; these units are known as "protein skimmers". However it has much broader application in the chemical process industry and can be used for the removal of surface active contaminants from waste water streams in addition to the enrichment of bio-products. Foam fractionation is closely related to the process of froth flotation in which hydrophobic particles attach to the surface of bubbles which rise to form a pneumatic (i.e. rising) foam. In this way, relatively hydrophobic particles can be separated from relatively hydrophilic particles. In one embodiment, the protein skimmer could have more than one air inlet chamber 55 (acting as an airlift tube to circulate the water in the tank). In another embodiment, there could be more than one air stone. In yet another embodiment, there could be more than one outlet and/or more than one inlet within the air inlet chamber 55. In still another embodiment, the orientation and locations of the air stone(s), outlet(s) and/or inlet(s) may be altered and rearranged. In yet another embodiment, a foam fractioning device/protein skimmer is a separate, stand-alone device which may be inserted and/or withdrawn from a suitable location within a tank which permits its proper functioning.

In one embodiment of the present invention, the material depicted in FIG. 9 as biological media 40 located within the water inlet chamber 32 may function as a filter through which the water in the tank passes as it cycles through the tank. The water inlet chamber 32 includes a plurality of media screens. A first media screen 35 is positioned at the bottom of the water inlet chamber 32, a second media screen 36 is positioned in upper portions of the water inlet chamber 32 and a third media screen 37 is positioned at the top of the water inlet chamber 32 adjacent the cylindrical wall 27 and the upright wall 31. In exemplary embodiments, the screens are used to help position and maintain filtration media in various positions. In particular, a biological media can be positioned in the portions of the water inlet chamber designated at 40 and 41. A chemical media is positioned in the portion of the water inlet chamber 32 that is labeled as 42.

In one embodiment of the present invention, an air inlet foam fractioning device/protein skimmer is in direct communication with a water inlet chamber 32 which may include filtration media. In another embodiment, an aquarium as described in any of the previous embodiments, further includes a water outlet in communication with a filtration compartment 40 at the opposite end of a riser from the filtration compartment's water inlet.

In the drawings and specification there has been set forth a preferred embodiment of the invention, and although specific terms have been employed, they are used in a generic and descriptive sense only and not for purposes of limitation, the scope of the invention being defined in the claims

I claim:

1. An aquarium comprising:
    a plurality of exterior walls that define a tank;
    a semi cylindrical wall within said tank that defines a cylindrical viewing area;
    a first upright interior wall adjacent said cylindrical wall that defines an air inlet chamber between said cylindrical wall and the one of said exterior walls, said first upright interior wall comprising an upper vertically disposed portion and a lower diagonally disposed portion adjacent to said semi cylindrical wall which defines an air inlet compartment between said semi cylindrical wall and said exterior walls;
    a spillover riser in said air inlet chamber;
    a second upright interior wall adjacent to said semi cylindrical wall and opposite to said first suspended riser which defines a filtration compartment located between said semi cylindrical wall and said exterior walls.

2. The aquarium of claim 1 wherein said filtration compartment further comprising:
    a biological filtration media in said filtration compartment;
    a chemical filtration media in said filtration compartment;
    a media screen in said filtration compartment that separates said filtration compartment into a portion of biological filtration media and a portion of chemical filtration media.

3. The aquarium of claim 1 wherein said semi-cylindrical wall is comprised of separate, removable sections which are also interchangeable to alter the water flow characteristics/pattern within the viewing area of the tank.

4. The aquarium of claim 3 wherein said cylindrical wall includes stationary sections and movable sections.

5. The aquarium of claim 1 further including a water outlet in communication with said filtration compartment at the opposite end of a riser from the filtration compartment's water inlet.

6. The aquarium according to claim 1 wherein portions of said cylindrical wall are perforated to permit water to flow between said cylindrical viewing area and the remainder of said tank.

7. The aquarium according to claim 1 wherein at least one of said exterior walls is formed of a transparent polymer.

8. The aquarium according to claim 7 wherein all of said walls are formed of a transparent polymer.

9. The aquarium according to claim 1 wherein said air inlet chamber includes a vertical tube.

10. An aquarium comprising:
    a plurality of exterior walls that define a tank;
    a semi cylindrical wall within said tank that defines a cylindrical viewing area;
    a first upright interior wall adjacent said cylindrical wall that defines a air inlet chamber between said cylindrical wall and the one of said exterior walls, said first upright interior wall comprising an upper vertically disposed portion and a lower diagonally disposed portion adjacent to said semi cylindrical wall which defines an air inlet compartment between said semi cylindrical wall and said exterior walls, said air inlet chamber including an air stone and a froth chamber having a collection cup within the froth chamber to form a foam fractioning device/protein skimmer;
    a second upright interior wall which is a return riser that defines a channel between the first upright interior wall and the second upright interior wall;
    a spillover riser in said air inlet chamber;
    a third upright interior wall adjacent to said semi cylindrical wall and opposite to said first suspended riser which defines an water inlet chamber located between said semi cylindrical wall and said exterior walls.

11. The aquarium of claim 10 wherein said foam fractioning device/protein skimmer includes two or more air stones and/or two or more airlift tubes.

12. The aquarium of claim 10 wherein the a sliding door is located on the surface of said second upright interior wall, said sliding door is used to adjust the flow of water through the return riser to control the overall flow rate in the tank including the particular velocity of water movement in the viewing area.

13. The aquarium of claim 10 wherein said foam fractioning device includes one or more outlets, one or more inlets within the air inlet chamber.

14. The aquarium of claim 13 wherein the orientation and locations of the air stone(s), outlet(s) and/or inlet(s) may be altered and rearranged.

15. The aquarium of claim 10 wherein the foam fractioning device/protein skimmer is a separate, stand-alone device which may be inserted and/or withdrawn from a suitable location within a tank which permits its proper functioning.

16. The aquarium of claim 10 wherein the foam fractioning device/protein skimmer is in direct communication with said water inlet chamber which may include filtration media.

17. An aquarium according to claim 10 wherein portions of said cylindrical wall are perforated to permit water to flow between said cylindrical viewing area and the remainder of said tank.

18. An aquarium according to claim 10 wherein at least one of said exterior walls is formed of a transparent polymer.

19. An aquarium according to claim 18 wherein all of said walls are formed of a transparent polymer.

20. An aquarium according to claim 10 wherein said air inlet chamber includes a vertical tube.

* * * * *